UNITED STATES PATENT OFFICE.

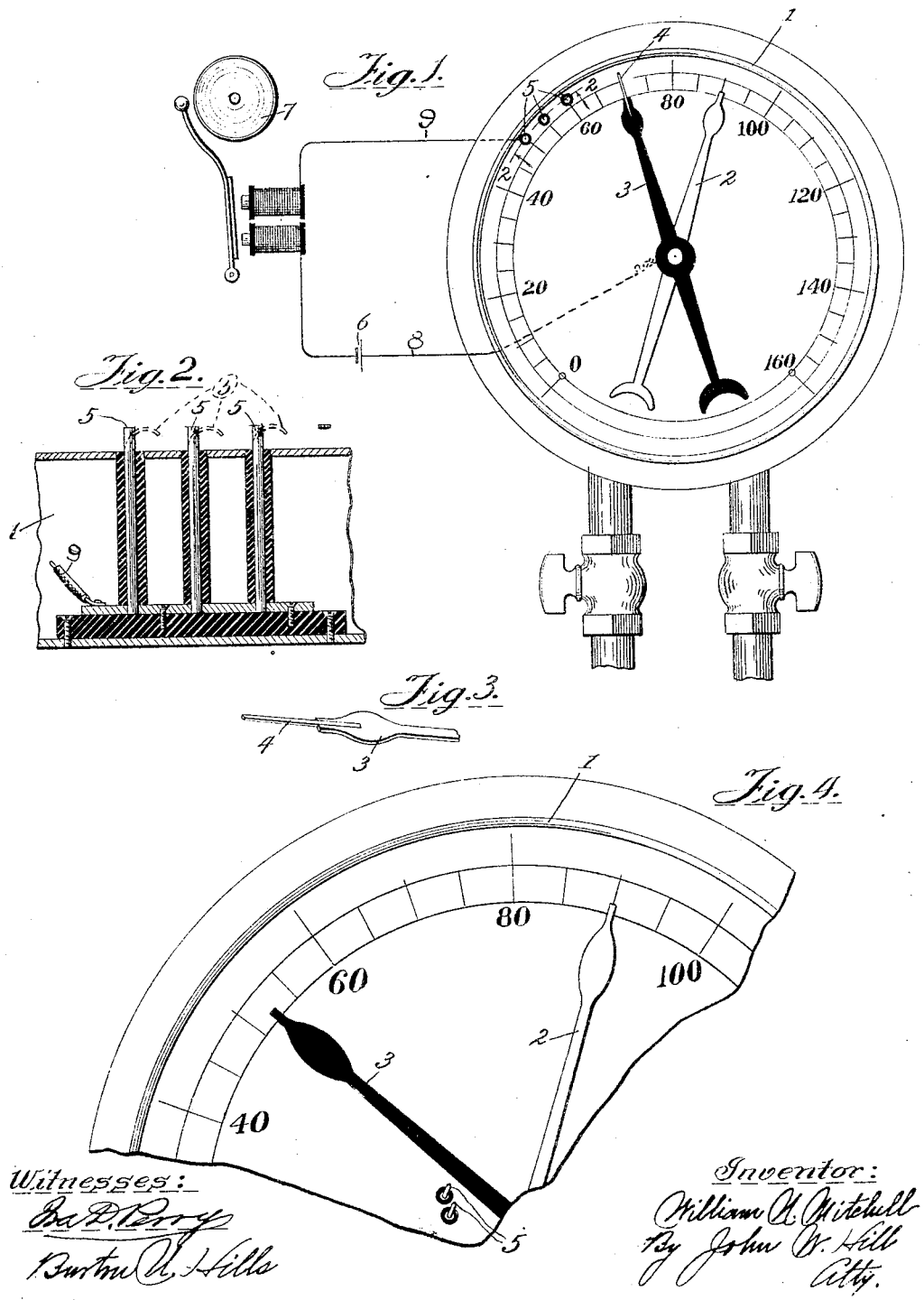

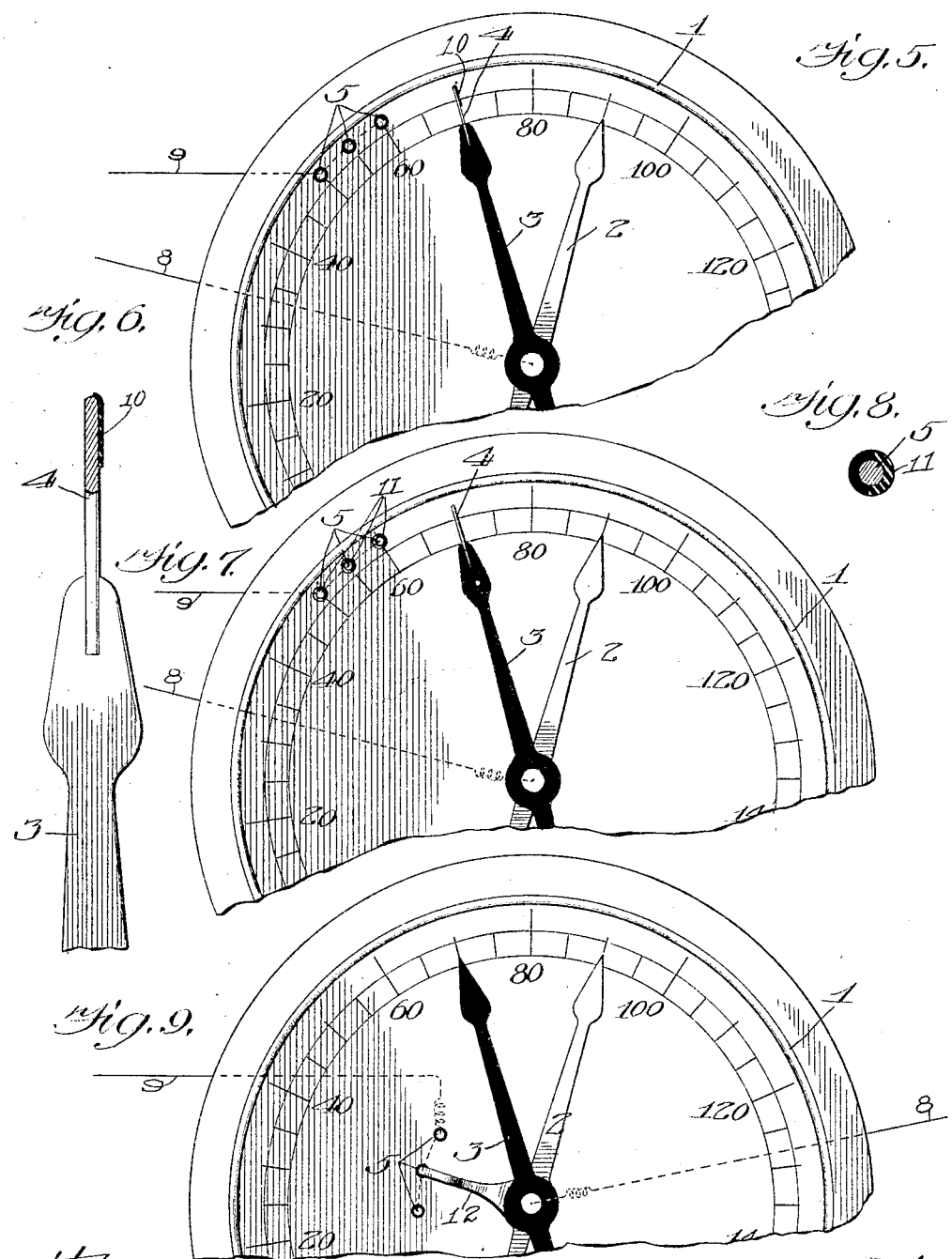

WILLIAM N. MITCHELL, OF CHICAGO, ILLINOIS.

PRESSURE-GAGE.

No. 807,568.      Specification of Letters Patent.      Patented Dec. 19, 1905.

Application filed December 3, 1904. Serial No. 235,305.

*To all whom it may concern:*

Be it known that I, WILLIAM N. MITCHELL, a citizen of the United States, residing at Chicago, county of Cook, and State of Illinois, have invented certain new and useful Improvements in Pressure-Gages, of which the following is a description.

My invention relates to that class of devices known as "pressure-gages," which are employed to indicate the pressure of steam, water, air, gas, or the like above or below the normal atmospheric pressure.

The object of my invention is to provide a positive, inexpensive, and efficient means for attracting the attention of an attendant or others when certain pressure or pressures is recorded by the gage; and to this end it consists in the novel construction, arrangement, and combination of parts herein shown and described, and more particularly pointed out in the claims.

In the accompanying drawings, wherein like or similar reference characters indicate like or corresponding parts, Figure 1 is a duplex air-gage equipped with my device, which is shown in the figure diagrammatically. Fig. 2 is a section taken substantially on line 2 2 of Fig. 1. Fig. 3 is a perspective view of a portion of the indicating-hand arranged to operate my device. Fig. 4 is a portion of a pressure-gage, showing a modified form and position of contact-points. Figs. 5, 7, and 9 are modified forms of my device. Fig. 6 is a detail of part 4, as shown in Fig. 5. Fig. 8 is a transverse section of one of the pins 5, showing the arrangement of the insulation in the form shown in Fig. 7.

In the drawings my device is shown connected to a duplex air-gage, such as is usually employed in connection with the air-brake system upon railroads, my device being arranged to give notice when the black or train-line hand indicates certain pressures by ringing a bell, although it is evident that my device may be as readily attached to any form of gage or that any desired means of attracting the attention of the attendant may be employed in place of the bell.

The gage 1 may be of any preferred type provided with suitable indicating means. As shown, two similar hands or pointers 2 and 3 are employed, each connected to suitable mechanism for indicating the pressure upon parts of the system, the hand 3 being the train-line indicator and the one with which, in the drawings, my device is arranged to coöperate. For this purpose a contact-point 4 is formed upon or attached to the hand 3, so that as the hand is partially rotated by the varying pressure the point 4 will momentarily contact with suitable means upon the dial or adjacent parts when the predetermined pressures are indicated. As shown, the pins 5 5 are provided to project through the dial of the gage 1 at the desired points in the path of the hand, but are insulated from the body of the gage and so arranged that they will not interfere with the movements of the hands.

A battery 6 or other source of electric energy is provided, one pole being connected, by means of a conductor 8, to the hand 3 in any suitable manner and the other by the conductor 9 to the several pins 5 with suitable means arranged in the circuit to attract the attention when the circuit is completed by the spring-tip 4 of the hand 3 coming in contact with one of the pins. As shown, the bell 7 is arranged in the circuit for this purpose; but it is obvious that a whistle or light may be employed in place of the bell.

If it is desired, my device may be operated only when the hand is moving one way—that is, only when the pressure is falling or only when the pressure is rising. In such case one side of the spring 4 may be covered at the point where it contacts with the pins with a suitable insulating material 10, as shown in Figs. 5 and 6, or if it is desired that some of the pins shall indicate only when the hand is moving in one direction while the others shall indicate for both directions a suitable insulating-shield 11 (see Figs. 7 and 8) may be arranged at the pins where contact is to be made in one direction only to prevent electrical contact between the pin and spring when the hand is moving in the direction in which the device is not desired to operate.

In Fig. 4 the hand 3 is arranged to pass over and contact with the upper ends of the pins 5, and thus complete the circuit.

It is obvious that it is not essential to employ the regular pointer used in the gage to indicate the pressure for closing the circuit as described, as it is evident that any suitable parts of the gage may be arranged to close the circuit. If desired, a contact point or arm may be attached to the regular pointer or to the shaft carrying the same for this purpose. In either case the points are arranged to perform the desired function. In such an arrangement the operation would be the same as heretofore described.

As shown in Fig. 4, two pins 5 are arranged in close proximity, so that at this point as the hand 3 passes the bell or other signal will be operated twice in close succession.

Having thus described my improvement it is obvious that various immaterial modifications may be made without departing from the spirit of my invention. Hence I do not wish to be understood as limiting myself to the exact form or construction shown.

What I claim as new, and desire to secure by Letters Patent, is—

1. A device of the kind described, comprising a pressure-gage provided with a movable indicator, one or more fixed pins positioned in the path of a part of said indicator, means for preventing electrical contact between said pins and said indicator when the indicator is moving in one direction, in combination with an electric circuit one pole of which is connected to said pins and the opposite pole to said indicator, and a signal adapted to operate when said circuit is completed.

2. A device of the kind described, comprising a pressure-gage provided with a movable indicator, one or more fixed pins positioned in the path of a part of said indicator, and insulating material partly inclosing one or more of said pins at their point of contact with said indicator, in combination with an electric circuit one pole of which is connected to said pins and the opposite pole to said indicator, and a signal adapted to operate when said circuit is completed.

In testimony whereof I have hereunto signed my name in the presence of two (2) subscribing witnesses.

WILLIAM N. MITCHELL.

Witnesses:
BURTON U. HILLS,
CHARLES I. COBB.